United States Patent
Wentink

(10) Patent No.: US 8,111,677 B2
(45) Date of Patent: Feb. 7, 2012

(54) SYSTEMS AND METHODS OF COMBINED BLUETOOTH AND WLAN SIGNALING

(75) Inventor: Maarten Menzo Wentink, Utrecht (NL)

(73) Assignee: Conexant Systems, Inc., Newport Beach, CA (US)

( * ) Notice: Subject to any disclaimer, the term of this patent is extended or adjusted under 35 U.S.C. 154(b) by 912 days.

(21) Appl. No.: 12/108,759

(22) Filed: Apr. 24, 2008

(65) Prior Publication Data

US 2009/0323569 A1 Dec. 31, 2009

(51) Int. Cl.
*H04W 4/00* (2009.01)

(52) U.S. Cl. ........................................ 370/338

(58) Field of Classification Search ............... None
See application file for complete search history.

(56) References Cited

U.S. PATENT DOCUMENTS

| 2004/0242159 A1* | 12/2004 | Calderon et al. | 455/63.3 |
|---|---|---|---|
| 2005/0186906 A1* | 8/2005 | Hussmann | 455/41.2 |
| 2007/0135046 A1* | 6/2007 | Kapur et al. | 455/41.2 |
| 2007/0161349 A1* | 7/2007 | Grushkevich | 370/437 |
| 2008/0310332 A1* | 12/2008 | Hansen et al. | 370/310 |
| 2009/0060193 A1* | 3/2009 | Jahnen et al. | 380/275 |
| 2009/0141692 A1* | 6/2009 | Kasslin et al. | 370/338 |

* cited by examiner

*Primary Examiner* — Anh-Vu Ly

(74) *Attorney, Agent, or Firm* — Jackson Walker LLP; Christopher J. Rourk

(57) ABSTRACT

Disclosed herein are systems and methods of combined Bluetooth and WLAN signaling. Such systems and methods may use a Bluetooth connection to signal WLAN capabilities and to exchange WLAN security keys. Once the file transfer has started, the actual data may be transmitted over the WLAN connection rather than over the Bluetooth connection. The WLAN connection may have a much higher throughput than the Bluetooth connection, and WLAN capability has increasingly become present inside Bluetooth enabled devices. The Bluetooth connection may be used as a control channel, while the WLAN connection may be used for data transfer.

9 Claims, 4 Drawing Sheets

SYSTEMS AND METHODS OF COMBINED BLUETOOTH AND WLAN SIGNALING

TECHNICAL FIELD

The present disclosure is generally related to wireless systems and, more particularly, is related to systems and methods of combined Bluetooth and wireless local area network (WLAN) signaling.

BACKGROUND

Communication networks come in a variety of forms. Notable networks include wireline and wireless. Wireline networks include local area networks (LANs), DSL networks, and cable networks, among others. Wireless networks include cellular telephone networks, classic land mobile radio networks and satellite transmission networks, among others. These wireless networks are typically characterized as wide area networks. More recently, wireless local area networks and wireless home networks have been proposed, and standards, such as Bluetooth and IEEE 802.11, have been introduced to govern the development of wireless equipment for such localized networks.

A WLAN typically uses infrared (IR) or radio frequency (RF) communications channels to communicate between portable or mobile computer terminals and stationary access points or base stations. These access points are, in turn, connected by a wired or wireless communications channel to a network infrastructure which connects groups of access points together to form the LAN, including, optionally, one or more host computer systems.

Wireless protocols such as Bluetooth and IEEE 802.11 support the logical interconnections of such portable roaming terminals having a variety of types of communication capabilities to host computers. The logical interconnections are based upon an infrastructure in which at least some of the terminals are capable of communicating with at least two of the access points when located within a predetermined range, each terminal being normally associated, and in communication, with a single one of the access points. Based on the overall spatial layout, response time, and loading requirements of the network, different networking schemes and communication protocols have been designed so as to most efficiently regulate the communications.

IEEE Standard 802.11 ("802.11") is set out in "Wireless LAN Medium Access Control (MAC) and Physical Layer (PHY) Specifications" and is available from the IEEE Standards Department, Piscataway, N.J. 802.11 permits either IR or RF communications at 1 Mbps, 2 Mbps and higher data rates, a medium access technique similar to carrier sense multiple access/collision avoidance (CSMA/CA), a power-save mode for battery-operated mobile stations, seamless roaming in a full cellular network, high throughput operation, diverse antenna systems designed to eliminate "dead spots," and an easy interface to existing network infrastructures.

As communication devices become smaller, while providing increasing functionality, battery life and the ability to reduce power consumption during receive mode and increasing throughput that a client can achieve without leaving power-save mode raise significant design challenges. Thus, a heretofore unaddressed need exists in the industry to address the aforementioned deficiencies and inadequacies.

SUMMARY

Embodiments of the present disclosure provide a systems and methods of combined Bluetooth and WLAN signaling. Briefly described, in architecture, one embodiment of the system, among others, can be implemented as follows: a host processor; a first transceiver in communication with the host processor transceiving using a first protocol networking control information for the host processor; a second transceiver in communication with the host processor transceiving using a second protocol data packets for the host processor, wherein the first transceiver is used to configure the second transceiver.

Embodiments of the present disclosure can also be viewed as providing methods for combined Bluetooth and WLAN signaling. In this regard, one embodiment of such a method, among others, can be broadly summarized by: initiating a first communication connection between a first station and a second station using a first protocol; initiating a second communication connection between the first station and the second station using a second protocol; wherein the first communication connection is used for networking control information between the first station and the second station and the second communication connection is used for data communication between the first station and the second station, wherein the networking control information is used to configure the second communication connection.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various communication system and method embodiments. Such communication systems comprise, in one exemplary embodiment, an access point and one or more client devices that enable a control interface using a first protocol and a data interface using a second protocol. In an example embodiment, the first protocol may comprise the Bluetooth communication protocol and the second protocol may comprise IEEE802.11. One or both of the first and second protocols may be performed in any type of processor such as a MAC layer processor (though not limited to a MAC layer processor), including, but not limited to, a digital signal processor (DSP), a microprocessor unit (MCU), a general purpose processor, and an application specific integrated circuit (ASIC), among others. Because certain embodiments of communication systems that provide for the interaction of a data interface comprising an 802.11n system protocol, a brief description of 802.11 and layers in a wireless LAN (WLAN) follows with the understanding that the disclosed systems and methods may similarly apply to other communications systems.

IEEE 802.11n (the "802.11n proposal") is a high data rate extension of the 802.11a standard at 5 gigahertz (GHz) and 802.11g at 2.4 GHz. Both of these standards use orthogonal frequency division multiplexing (OFDM), which is a signaling scheme which uses multiple, parallel tones to carry the information. These tones are commonly called subcarriers. It is noted that, at the present time, the 802.11n proposal is only a proposal and is not yet a completely defined standard. Other applicable standards include Bluetooth, xDSL, other sections of 802.11, etc.

IEEE 802.11 is directed to wireless LANs, and in particular specifies the MAC and the PHY layers. These layers are intended to correspond closely to the two lowest layers of a system based on the ISO Basic Reference Model of OSI, i.e., the data link layer and the physical layer.

Figure 1:
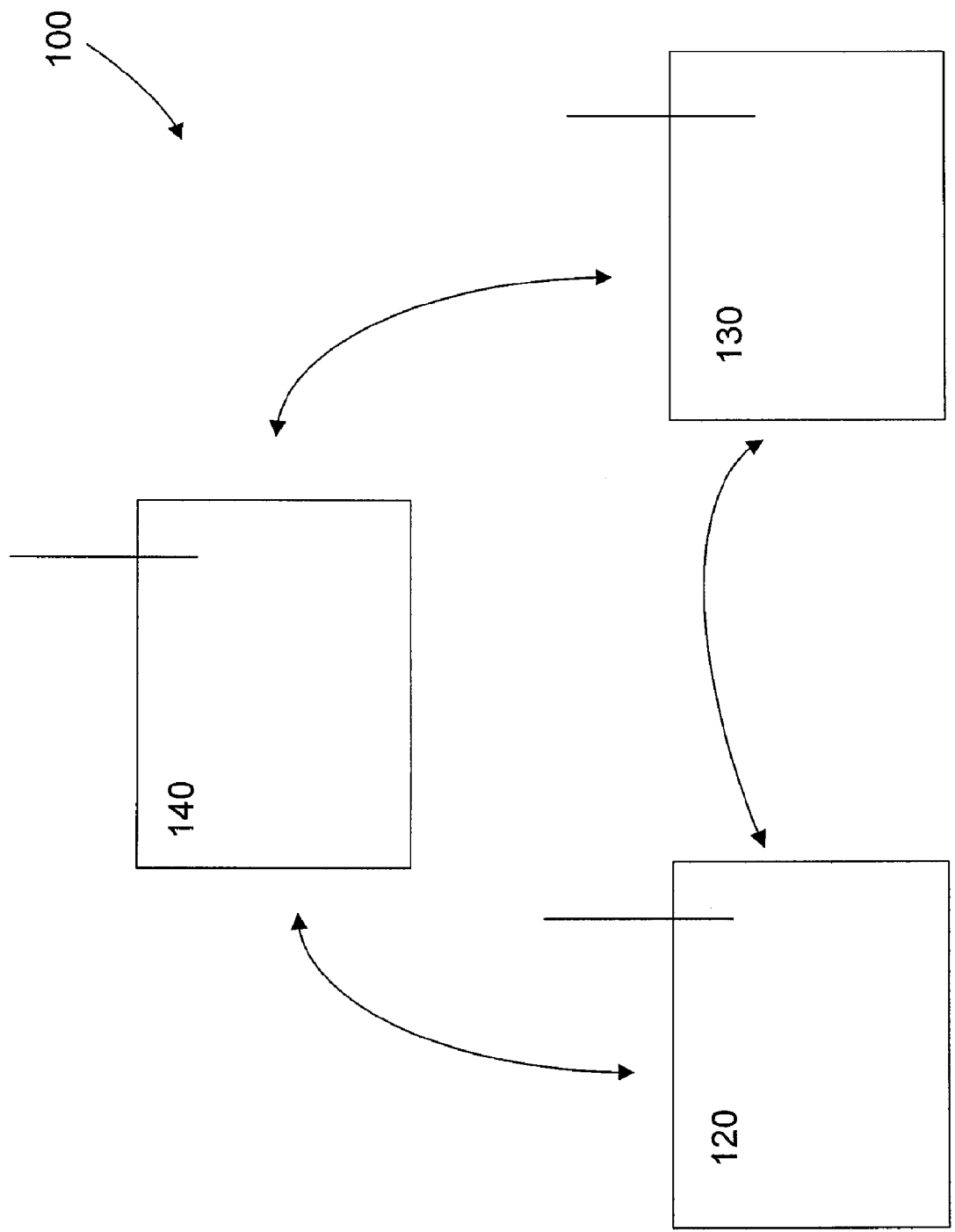
FIG. 1 is a diagram of an exemplary embodiment of a communication system comprising two stations and an access point.

This OSI model can be useful for transmissions between, for example, two stations, 120, 130 and access point (AP) 140 as shown in FIG. 1. An embodiment of a communication system 100 is shown that may provide for the combination of Bluetooth and WLAN signaling, and, in one embodiment, is configured as a wireless ad hoc network (IBSS). An IBSS is a group of 802.11 stations such as stations 120, 130 communicating with one another. Stations 120, 130 of communication system 100 may comprise transceivers for transmitting and receiving data streams between stations 120, 130, and may include multiple antennas for receiving and/or transmitting. Stations 120, 130 may comprise two client stations or a client station and an AP 140. Stations 120, 130 do not necessarily have the same number of antennas. Stations 120, 130 may transmit using, as non-limiting examples, a time division multiple access (TDMA) protocol or a Carrier Sense Multiple Access with Collision Avoidance (CSMA/CA) protocol, or a combination of the same and/or other protocols. Although only two stations are provided in this example, the disclosed principles of combined Bluetooth and 802.11 signaling are also applicable to larger networks with more devices. Certain embodiments of systems and methods of combined Bluetooth and 802.11 signaling may also be implemented as a basic service set (BSS). A BSS is a group of 802.11 stations with a central access point (AP). An AP may be the central access point for a plurality of stations in a BSS.

In some embodiments, each station 120, 130 comprises a PHY signal processor configured to implement communications operations, in addition to performing combined Bluetooth and 802.11 signaling. That is, each PHY signal processor, alone, or in combination with other logic or components, implements the functionality of the various embodiments. Functionality of systems and methods of combined Bluetooth and 802.11 signaling may be embodied in a wireless radio, or other communication device. Such a communication device may include many wireless communication devices, including computers (desktop, portable, laptop, etc.), consumer electronic devices (e.g., multi-media players), compatible telecommunication devices, personal digital assistants (PDAs), or any other type of network devices, such as printers, fax machines, scanners, hubs, switches, routers, set-top boxes, televisions with communication capability, etc.

Example embodiments will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The logic of the example embodiments of this disclosure can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments of the present disclosure in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of the example embodiments of the present disclosure in logic embodied in hardware or software-configured mediums.

Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved, as would be understood by those reasonably skilled in the art. In addition, the process descriptions or blocks in flow charts should be understood as representing decisions made by a hardware structure such as a state machine known to those skilled in the art.

Figure 2:
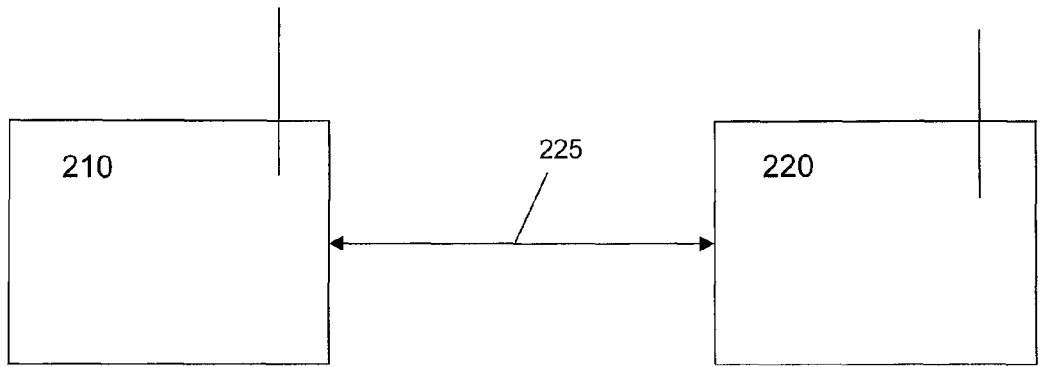
FIG. 2 is a diagram of three example embodiments of communication connections for the communication system of FIG. 1.
Figure 2:
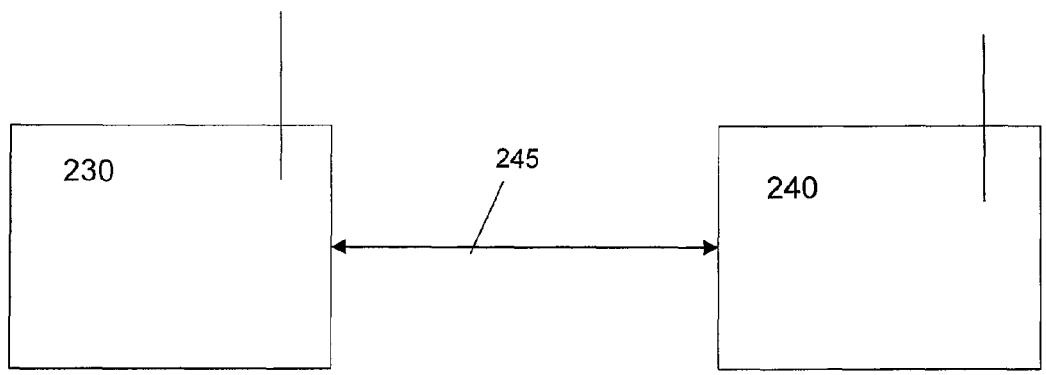
Figure 2:
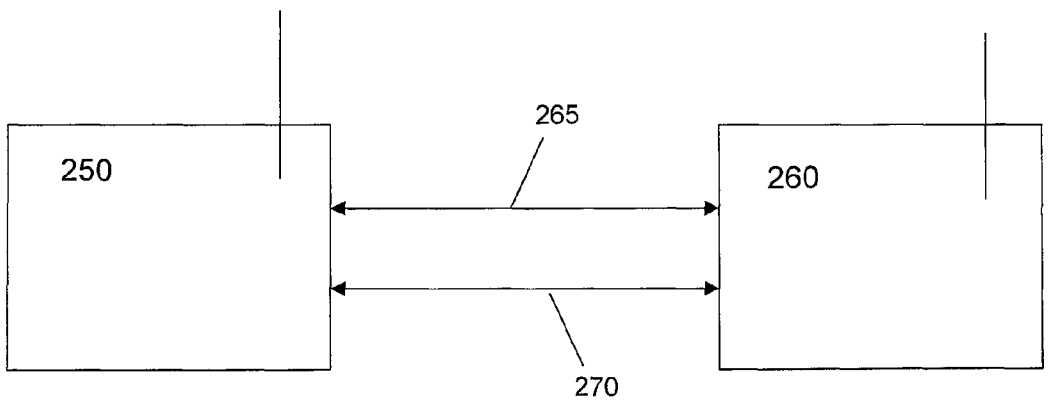

FIG. 2 provides three example embodiments of communication links between two stations. Stations 210 and 220 transceive over Bluetooth communication link 225. Stations 230 and 240 transceive over WLAN communication link 245. Stations 250 and 260 transceive over Bluetooth communication link 265 as well as over WLAN communication link 270.

Figure 3:
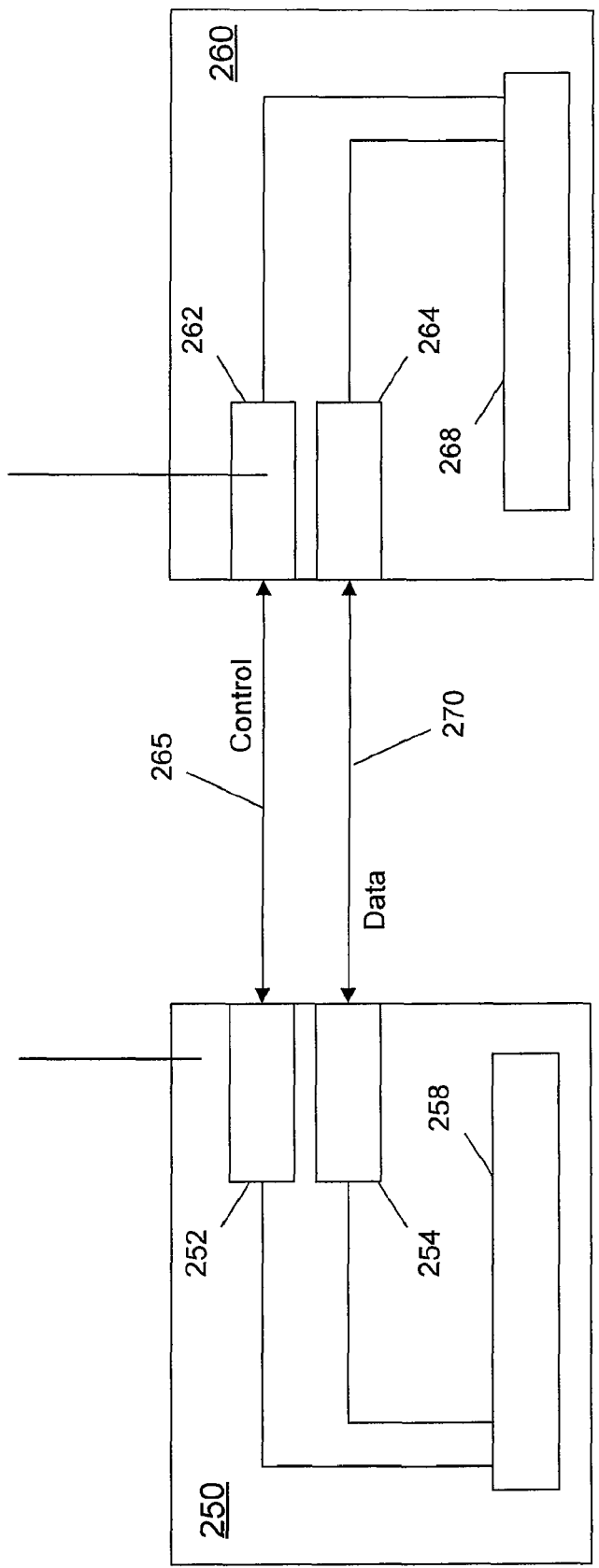
FIG. 3 is a diagram of an example embodiment of the communication system of FIG. 1 using a Bluetooth and WLAN protocols.

Example system and method embodiments of the present disclosure as disclosed in FIG. 3 involve the use of a wireless local area network (WLAN) to increase the throughput of a Bluetooth link. Bluetooth can currently be used to set up a connection between devices 120, 130 of FIG. 1, for instance, with the purpose of sending a file from one device to the other. Bluetooth has an intuitive interface for setting up such temporary connections for this purpose. WLAN does not have this, but WLAN can achieve much higher throughput. Non-limiting example embodiments of combined Bluetooth and 802.11 signaling between stations 250 and 260 provided in FIG. 3. Station 250 comprises transceivers 252, 254, and host processor 258. Station 260 comprises transceivers 262, 264, and host processor 268. Stations 250 and 260 may use Bluetooth connection 265 between transceivers 252, 262 to signal WLAN capabilities and to exchange WLAN security keys. Once the file transfer has started, the actual data may be transmitted over WLAN connection 270 between transceivers 254, 264 rather than over Bluetooth connection 265. WLAN connection 270 may have a much higher throughput than Bluetooth connection 265, and WLAN capability has increasingly become present inside Bluetooth enabled devices. Bluetooth connection 265 may be used as a control channel, while WLAN connection 270 may be used for data transfer.

Non-limiting examples of WLAN specific control information which may be signaled over Bluetooth link 265 may include security keys, channel, Basic Service Set Identifier (BSSID), capability information, MAC address, etc. In fact, the use of Bluetooth enables IBSS (Independent Basic Service Set) operation without any beacons, because Bluetooth connection 265 may assume the role of a WLAN beacon or a probe response. Bluetooth link 265 may also be used to time the activation of the WLAN on both sides of the connection.

In an example embodiment, Bluetooth connection 265 may not be encrypted. An assumption made in Bluetooth technology is that the effective range is short and connections are short-lived (that is, on an ad-hoc basis), so that sufficient safeguard is provided against eavesdropping. In this light, it may be possible to limit WLAN connection 270 to the use of higher rate modulations (which typically will have the lowest range) such that the decodable WLAN range matches the decodable Bluetooth range. In this case, WLAN connection 270 may be unencrypted. When the WLAN automatically selects the highest possible modulation for the specific receiver, and WLAN connection 270 is terminated when the Bluetooth connection ends (i.e. when the devices get out of range), WLAN connection 270 may implicitly be limited to higher PHY rates. Encryption of WLAN connection 270 may be optional in this case.

In an example embodiment, Bluetooth connection 265 may be used to suspend or resume transmissions over WLAN connection 270 once WLAN connection 270 has been initiated. Suspending WLAN connection 270 may also be done through WLAN signaling (for example, by setting the PM bit inside the MAC header), but the indication that WLAN connection 270 is to be resumed may be provided through Bluetooth connection 265. Using this method, WLAN connection 270 may be inactivate until the actual data is being transferred. Moving WLAN power-save functionality onto Bluetooth connection 265 may further alleviate the need for beacons on the WLAN connection 270.

Combined Bluetooth and WLAN signaling may be achieved by setting up Bluetooth connection 265 first, and using Bluetooth connection 265 to set up WLAN connection 270. WLAN connection 270 may be used for actual bulk data transport, which will be faster because recent emphasis in WLAN development has been in speed.

Figure 4:
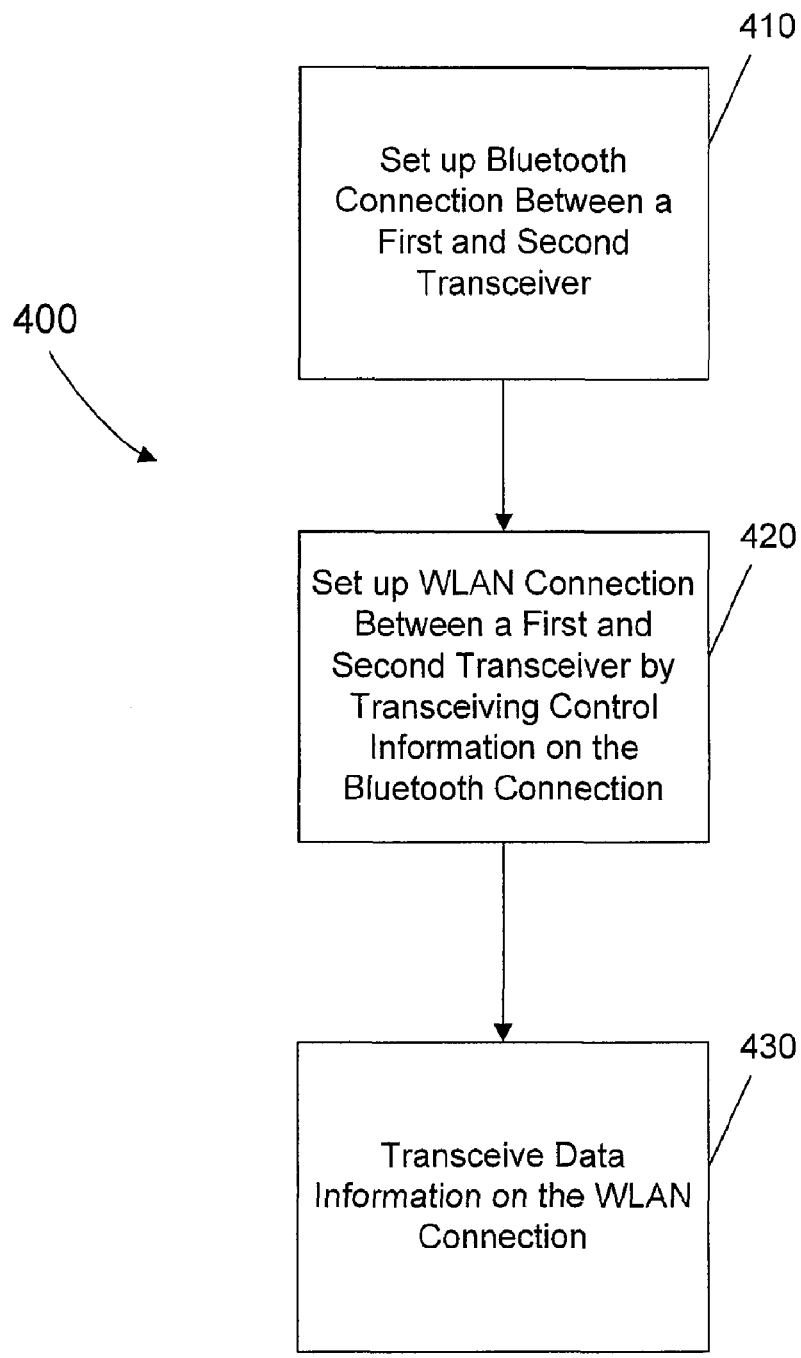
FIG. 4 is a flow diagram of an example embodiment of the method of communicating using the communication system of FIG. 3.

FIG. 4 provides a flow chart 400 of an example embodiment of a method of combined Bluetooth and WLAN signaling. In block 410, a Bluetooth connection is initiated between a first and second station. In block 420, a WLAN connection is initiated between the first and second stations by sending control information over the Bluetooth connection. In block 430, data is sent over the WLAN connection.

The flow chart of FIG. 4 shows the architecture, functionality, and operation of a possible implementation of the combined Bluetooth and WLAN signaling software. In this regard, each block represents a module, segment, or portion of code, which comprises one or more executable instructions for implementing the specified logical function(s). It should also be noted that in some alternative implementations, the functions noted in the blocks may occur out of the order noted in FIG. 4. For example, two blocks shown in succession in FIG. 4 may in fact be executed substantially concurrently or the blocks may sometimes be executed in the reverse order, depending upon the functionality involved, as will be further clarified hereinbelow.

It should be emphasized that the above-described embodiments of the present disclosure are merely possible examples of implementations, and are merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and to be protected by the following claims.

Therefore, at least the following is claimed:

1. A method comprising:
  initiating a first communication connection between a first station and a second station using a first protocol;
  initiating a second communication connection between the first station and the second station using a second protocol;
  wherein the first communication connection is used for networking control information between the first station and the second station and the second communication connection is used for data communication between the first station and the second station, and
  configuring the second communication connection through the first communication connection using the networking control information, the networking control information comprising BSSID (Basic Service Set Identifier), wherein the first communication connection is used in place of IBSS beacons.

2. The method of claim 1, wherein the first protocol is Bluetooth.

3. The method of claim 1, wherein the second protocol is 802.11.

4. The method of claim 1, wherein the first communication connection is unencrypted.

5. The method of claim 1, wherein the first communication connection communicates power save information.

6. The method of claim 5, wherein the power save information comprises on-off information for a second transceiver.

7. The method of claim 1, wherein the first station is at least one of a computer, a consumer electronic device, a personal digital assistant, a printer, a fax machine, a scanner, a hub, a switch, a router, a set-top box, and a televisions with communication capability.

8. A non-transitory computer readable medium encoded with computer executable instructions comprising:
logic configured to initiate a first communication connection between a first station and a second station using a first protocol;
logic configured to initiate a second communication connection between the first station and the second station using a second protocol;
wherein the logic is configured to use the first communication connection for networking control information between the first station and the second station and the second communication connection is used for data communication between the first station and the second station, the networking control information comprising BSSID (Basic Service Set Identifier), wherein the first communication connection is used in place of IBSS beacons,
wherein the logic is configured to use the networking control information to configure the second communication connection.

9. The computer readable medium of claim 6, wherein the first communication connection is unencrypted.

* * * * *

UNITED STATES PATENT AND TRADEMARK OFFICE
CERTIFICATE OF CORRECTION

| | | |
|---|---|---|
| PATENT NO. | : 8,111,677 B2 | Page 1 of 1 |
| APPLICATION NO. | : 12/108759 | |
| DATED | : February 7, 2012 | |
| INVENTOR(S) | : Wentink | |

It is certified that error appears in the above-identified patent and that said Letters Patent is hereby corrected as shown below:

Column 7, line 7, replace "televisions" with "television"

Signed and Sealed this
Twenty-seventh Day of March, 2012

David J. Kappos
*Director of the United States Patent and Trademark Office*